US011322752B2

(12) United States Patent
Huang

(10) Patent No.: US 11,322,752 B2
(45) Date of Patent: *May 3, 2022

(54) ANODE CROSS-SECTIONAL CHARACTERISTIC GRADIENT

(71) Applicant: Energizer Brands, LLC, St. Louis, MO (US)

(72) Inventor: Weiwei Huang, Westlake, OH (US)

(73) Assignee: Energizer Brands, LLC, St. Louis, MO (US)

(*) Notice: Subject to any disclaimer, the term of this patent is extended or adjusted under 35 U.S.C. 154(b) by 87 days.

This patent is subject to a terminal disclaimer.

(21) Appl. No.: 15/896,917

(22) Filed: Feb. 14, 2018

(65) Prior Publication Data

US 2018/0261851 A1 Sep. 13, 2018

Related U.S. Application Data

(60) Provisional application No. 62/469,697, filed on Mar. 10, 2017.

(51) Int. Cl.
*H01M 6/00* (2006.01)
*H01M 6/08* (2006.01)
(Continued)

(52) U.S. Cl.
CPC ........... *H01M 6/085* (2013.01); *H01M 4/244* (2013.01); *H01M 4/364* (2013.01); *H01M 4/9041* (2013.01); *H01M 6/045* (2013.01)

(58) Field of Classification Search
None
See application file for complete search history.

(56) References Cited

U.S. PATENT DOCUMENTS 5,401,590 A 3/1995 Chalilpoyil et al.
5,962,163 A 10/1999 Urry
(Continued)

FOREIGN PATENT DOCUMENTS

| AU | 438685 B2 | 7/1973 |
| EP | 2278645 A1 | 1/2011 |
| WO | WO 2000/030193 | 5/2000 |

OTHER PUBLICATIONS

Samal, Prasan K. Newkirk, Joseph W.. (2015). ASM Handbook, vol. 7—Powder Metallurgy (2015)—12.2 Powder Flow. (pp. 116-117). ASM International. Retrieved from https://app.knovel.eom/hotlink/pdf/id:kt010RU151/asm-handbook-volume-7/powder-flow (Year: 2015).*

(Continued)

*Primary Examiner* — Milton I Cano
*Assistant Examiner* — Mary G Henshaw
(74) *Attorney, Agent, or Firm* — Alston & Bird LLP

(57) ABSTRACT

Various embodiments are directed to an electrochemical cell having a non-homogeneous anode. The electrochemical cell includes a container, a cathode forming a hollow cylinder within the container, an anode positioned within the hollow cylinder of the cathode, and a separator between the cathode and the anode. The anode defines a characteristic gradient between an interior portion of the anode and the outermost surface of the anode adjacent the separator. The characteristic gradient may be defined as, for example, an average active material particle size within the anode that changes as a function of the radial location within the anode or a surfactant concentration gradient that changes as a function of the radial location within the anode.

18 Claims, 3 Drawing Sheets

(51) Int. Cl.
*H01M 4/90* (2006.01)
*H01M 6/04* (2006.01)
*H01M 4/24* (2006.01)
*H01M 4/36* (2006.01)

(56) References Cited

U.S. PATENT DOCUMENTS

| | | | |
|---|---|---|---|
| 7,597,824 B2 | 10/2009 | Zhu et al. | |
| 8,039,150 B2 | 10/2011 | Burchardt | |
| 8,323,835 B2 | 12/2012 | Davis et al. | |
| 2007/0248879 A1* | 10/2007 | Durkot .................. | H01M 4/244 |
| | | | 429/130 |
| 2010/0081046 A1 | 4/2010 | Davis et al. | |
| 2018/0316064 A1 | 11/2018 | Wei et al. | |
| 2020/0106109 A1 | 4/2020 | Liu et al. | |

OTHER PUBLICATIONS

Horn, Quinn C., et al., "Morphology and Spatial Distribution of ZnO Formed in Discharged Alkaline Zn/MnO₂ AA Cells", *Journal of The Electrochemical Society*, 2003, pp. A652-A658, vol. 150, Issue 5, The Electrochemical Society, Inc., U.S.

Mao, Z., et al., "Mathematical Modeling of a Primary Zinc/Air Battery", *J. Electrochem. Soc.*, Apr. 1992, pp. 1105-1114, vol. 139, No. 4, The Electrochemical Society, Inc.

Newman, John S., "Theoretical Analysis of Current Distribution in Porous Electrodes", *Journal of the Electrochemical Society*, Dec. 1962, pp. 1183-1191, vol. 109, No. 12, The Electrochemical Society, Inc., U.S.

Orikasa, Yuki, et al., "Ionic Conduction in Lithium Ion Battery Composite Electrode Governs Cross-sectional Reaction Distribution", *Scientific Reports*, May 19, 2016, 6 pages, www.Nature.com.

Sun, Yank-Kook, et al., "Nanostructured high-energy cathode materials for advanced lithium batteries", *Nature Materials Letters (Advance Online Publication)*, Oct. 7, 2012, 6 pages, Macmillan Publishers Limited.

Ghavami, Robab Khayat, et al., "Performance improvements of alkaline batteries by studying the effects of different kinds of surfactant and different derivatives of benzene on electrochemical properties of electrolytic zinc", Journal of Power Sources, Nov. 22, 2006, pp. 893-899, vol. 162, Elsevier, B.V., Netherlands.

Huot, Jean-Yves, et al., "Electrochemical performance of gelled zinc alloy powders in alkaline solutions", Journal of Power Sources, Apr. 21-23, 1997, pp. 81-85, vol. 65, Elsevier Science S.A., Netherlands.

Salager, Jean-Louis, "Surfactants, Types and Uses", FIRP Booklet # E300-A, 2002, 50 pages, Version 2, Universidad De Los Andes, Venezuela.

* cited by examiner

ANODE CROSS-SECTIONAL CHARACTERISTIC GRADIENT

CROSS-REFERENCE TO RELATED APPLICATIONS

This patent application claims priority from of U.S. Provisional Application Ser. No. 62/469,697, filed Mar. 10, 2017, which is incorporated herein by reference in its entirety.

BACKGROUND

Particularly for bobbin-style electrochemical cells commonly found in alkaline batteries, the positional oxidation of anode particles impacts the overall performance of the electrochemical cell. In these bobbin-style cells, a cathode (typically comprising Manganese dioxide as an active material in alkaline primary cells) is formed as a generally hollow tube positioned within a cell container. An anode (typically comprising zinc or a zinc composite) is positioned within the hollow interior of the cathode and is separated from the cathode by a separator. A current collector (e.g., a nail) is positioned at the center of the anode. The entire composition is saturated in a KOH electrolyte.

As the battery discharges, the zinc particles are oxidized to form non-reactive zinc oxide particles within the anode. At a theoretical level, once the supply of zinc within the anode is exhausted by the conversion of zinc to zinc oxide, the anode is fully discharged.

Alkaline cells are highly efficient at low discharge rates and the conversion of zinc to generally more voluminous zinc oxide occurs generally uniformly across the cross section of the anode (i.e., between the separator and the current collector). However, as the discharge rate increases, the conversion of zinc to the higher-volume zinc oxide becomes increasingly biased toward the separator. Thus, zinc particles within the interior of the anode may not be fully utilized during moderate and high rate discharge, thereby preventing these zinc particles from contributing to the discharge performance of the cell. Because the anode active material is not fully exhausted, the useful life of electrochemical cell is diminished at higher drain rates, and a non-negligible portion of the anode zinc is prevented from full use during discharge.

Various attempts have been made to impede the formation of a zinc oxide barrier near the separator of alkaline electrochemical cells during moderate and high discharge use, however such attempts have generally resulted in decreased low discharge rate performance. For example, surfactants have been added to coat zinc particles so as to increase a charge transfer resistance of an anode and encourage a more uniform zinc to zinc-oxide conversion. However, such surfactants generally increase the charge transfer resistance in the anode, thereby decreasing the overall performance of the electrochemical cell.

According, there is a continuing need for products and methods enabling a more efficient usage of anode active materials in electrochemical cells, particularly those providing balanced cell performance characteristics at both low- and high-discharge rates.

BRIEF SUMMARY

Various embodiments address anode discharge non-uniformity and to improve efficiency of the anode in moderate- and high-discharge rate applications by varying the concentration of anode components as a function of distance away from the cell separator. For example, biasing the density and/or concentration of zinc particles within the anode toward the separator, varying the average zinc particle size and/or the an active material alloy composition across the anode, varying a concentration of surfactant and/or surfactant composition across the anode, and/or the like may increase the overall usage of anode active ingredients during moderate- and high-discharge applications and reduce off-gassing within the anode, without negatively affecting the low-discharge performance of such electrochemical cells.

Various embodiments are directed to an electrochemical cell, such as a primary alkaline electrochemical cell, comprising a container; a cathode forming a hollow cylinder and having a cathode outer surface adjacent an inner surface of the container and a cathode inner surface defining an interior portion of the cathode; an anode positioned within an interior portion of the cathode, wherein the anode defines an anode outer surface adjacent the cathode inner surface; a separator disposed between the anode outer surface and the cathode inner surface; and an electrolyte; wherein the anode defines a characteristic gradient in a radial direction between a central portion of the anode and the anode outer surface.

In certain embodiments, the characteristic gradient may be continuous between the central portion of the anode and the anode outer surface. Alternatively, the characteristic gradient may be defined by discrete portions within the anode, wherein the characteristic gradient is defined by a first anode portion comprising the central portion of the anode and a second anode portion between the anode outer surface and the first anode portion, wherein the first anode portion comprises a first anode composition defining a first anode characteristic and the second anode portion comprises a second anode composition defining a second anode characteristic, and wherein the first anode composition is different from the second anode composition.

In certain embodiments, the characteristic gradient may be defined as a change in the average active material particle size and/or active material alloy composition within the anode as a function of the radial location within the anode. Moreover, in various embodiments, the characteristic gradient may be defined as a change in the concentration of a surfactant within the anode as a function of the radial location within the anode.

Moreover, certain embodiments are directed to a method of forming an electrochemical cell, such as an alkaline primary cell. The method may comprise: providing a container; forming a cathode within the container, wherein the cathode is generally cylindrical and defining a cathode outer surface positioned adjacent an interior surface of the container and a cathode interior surface defining an inner portion of the cathode; positioning a separator within the inner portion of the cathode; forming a first anode portion within the inner portion of the cathode on an opposite side of the separator, wherein the first anode portion defines an anode exterior surface adjacent the separator and an anode interior surface defining an inner portion of the anode; and forming a second anode portion within the inner portion of the anode, wherein the second anode portion has an anode characteristic different from the first anode portion.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Alkaline electrochemical cells are commercially available in cell sizes commonly known as LR6 (AA), LR03 (AAA), LR14 (C) and LR20 (D). The cells have a cylindrical shape that complies with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

Figure 1:
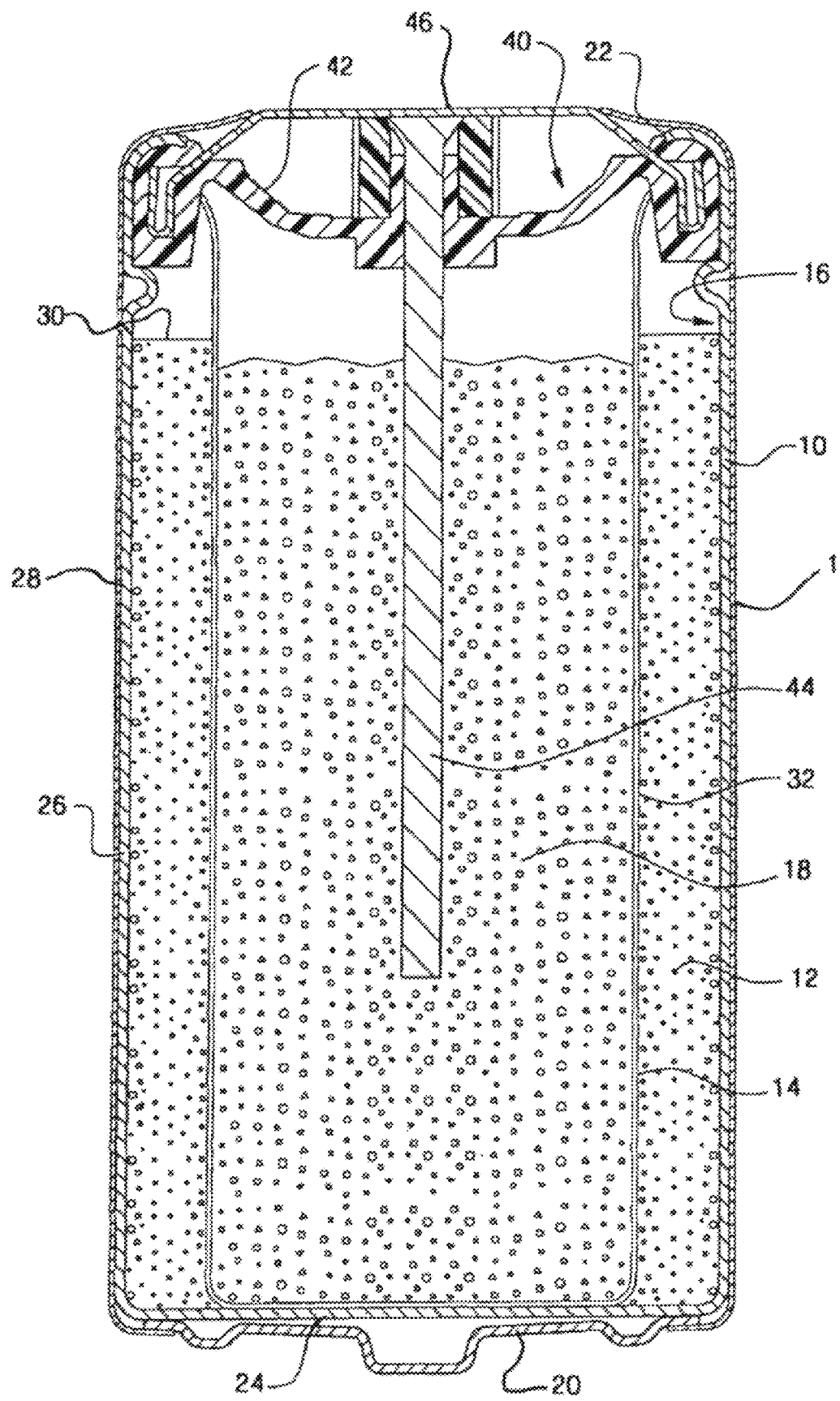
FIG. 1 is a cross-sectional elevational view of an alkaline electrochemical cell according to one embodiment.

FIG. 1 shows a cylindrical cell 1 in elevational cross-section, with the cell having a nail-type or bobbin-type construction and dimensions comparable to a conventional LR6 (AA) size alkaline cell. However, it is to be understood that cells according to various embodiments can have other sizes and shapes, such as a prismatic or button-type shape; and electrode configurations, as known in the art. The materials and designs for the components of the electrochemical cell illustrated in FIG. 1 are for the purposes of illustration, and other materials and designs may be substituted.

The electrochemical cell 1 includes a container or can 10 having a closed bottom end 24, a top end 22, and sidewall 26 therebetween. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, which may be plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 may contain a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a hole (e.g., a centrally located hole) in closure member 42.

First electrode 18 may be a negative electrode or anode. The negative electrode includes a mixture of one or more active materials (e.g., zinc), an electrically conductive material, solid zinc oxide, and/or, in some embodiments, a surfactant. The negative electrode can optionally include other additives, for example a binder or a gelling agent, and the like.

Although the embodiment of FIG. 1 illustrates the first electrode 18 as having generally uniform characteristics, it should be understood that various embodiments comprise a non-uniform anode configuration. For example, the first electrode 18 may define a characteristic gradient between the outer surface of the first electrode 18 (e.g., proximate the separator 14) and the inner portion of the first electrode 18 (e.g., proximate the current collector 44). The gradient may be continuous, thereby gradually changing between a first characteristic and a second characteristic (e.g., by continuously varying the relative concentrations of the anode composition having the first anode characteristic and the anode composition having the second anode characteristic) or lock-step, thereby incorporating discrete regions defined by different characteristics. The characteristics may be average particle size of an active material (e.g., zinc), average active material alloy composition, average concentration of an active material, average concentration of an additive, average concentration of a surfactant, surfactant composition type, and/or the like. As non-limiting examples, the relative composition of active material as a percentage of the total composition of the first electrode 18 may vary along the radius of the first electrode 18 (e.g., between the outer surface and the inner portion of the first electrode 18); one or more active material particle characteristics (e.g., particle size, surface roughness, porosity, and/or the like) may vary along the radius of the first electrode 18; the active material alloy type may vary along the radius of the first electrode, the surfactant type may vary along the radius of the first electrode, the relative composition of surfactant as a percentage of the total composition of the first electrode 18 may vary along the radius of the first electrode 18; one or more particle characteristics of one or more inactive materials may vary along the radius of the first electrode 18; and/or the like.

Figure 2:
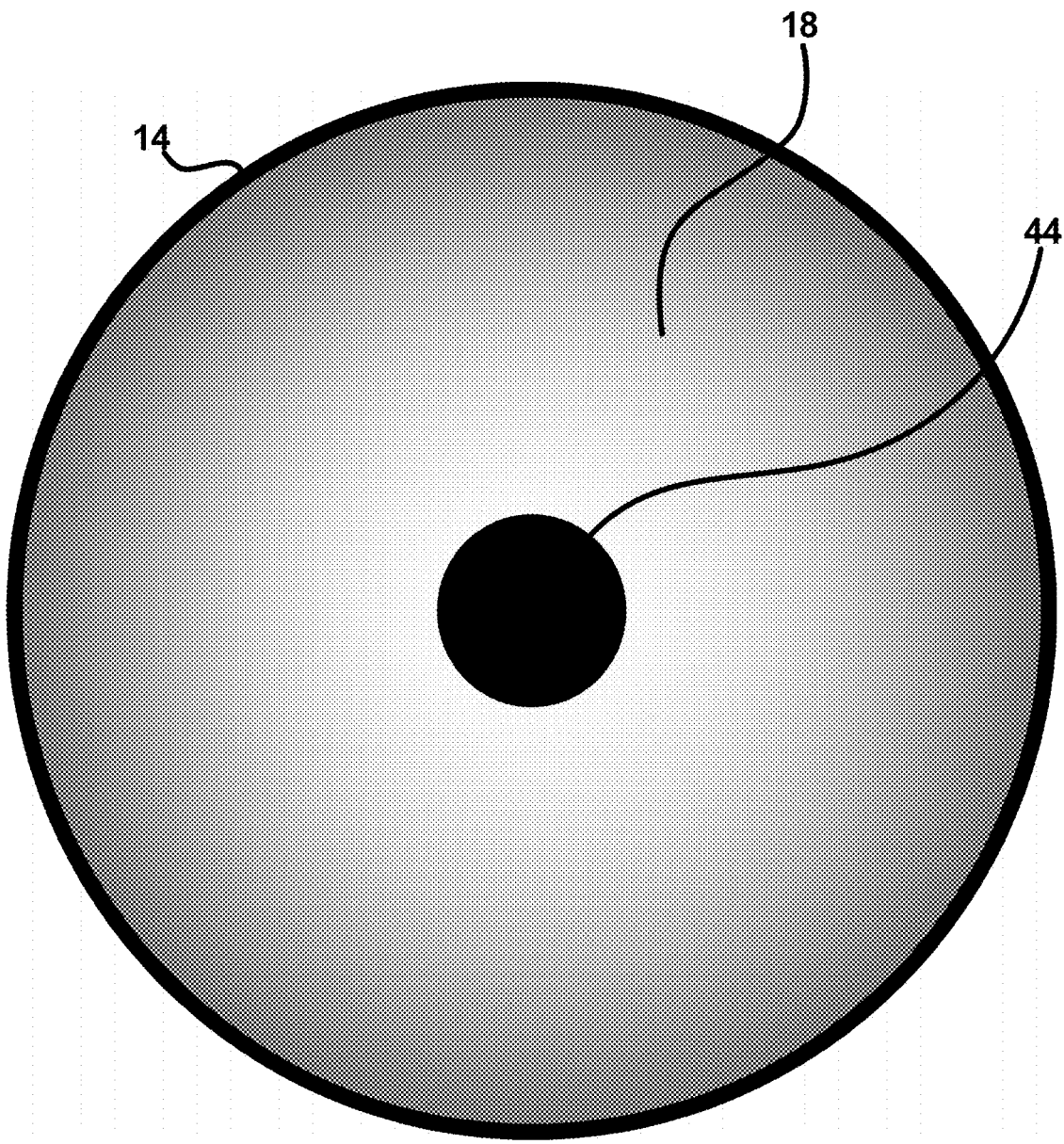
FIG. 2 is a schematic cross-sectional view of an anode according to one embodiment.

In certain embodiments, the characteristic gradient may be continuous (e.g., as illustrated in FIG. 2, which illustrates a cross-sectional schematic diagram of a first electrode 18 according to various embodiments). In such embodiments, one or more characteristics of the first electrode may change gradually, continuously, and/or the like along the radius of the first electrode 18, as illustrated based on the continuous darkening of the first electrode 18 between the current collector 44 and the separator 14 in FIG. 2. For example, in embodiments in which the average particle size of the active material changes along the radius of the first electrode, the average particle size may change continuously as a function of the radial location within the first electrode (e.g., following a linear function, an exponential function, a logarithmic function, a polynomial function, and/or the like) between the outer surface of the first electrode 18 and the inner portion of the first electrode 18. The change need not follow a particular formula, however the particle size should vary in non-discrete increments along the radius of the first electrode 18.

In other embodiments in which other anode characteristics change along the radius of the first electrode 18, the anode characteristics may change in a manner similar to that discussed in reference to the above-described continuous change in active material particle size along the radius of the first electrode 18. In various embodiments, multiple characteristics may change along the radius of the anode to form a multiple characteristics gradient anode composition. For example, the average particle size of the active material within the anode may change along the radius of the anode and the surfactant concentration may also change along the radius of the anode. Any of a variety of combinations of anode characteristic changes are envisioned to provide an anode having desirable characteristics. As a specific example, an anode characteristic gradient may define a first average active material particle size in a region of the anode proximate the separator and a first surfactant concentration gradient in the region of the anode proximate the separator; and a second average active material particle size (e.g., smaller than the first average active material particle size) and a second surfactant concentration (e.g., lower than the first surfactant concentration) in a region of the anode proximate the current collector. Such a configuration may desirably increase high-rate discharge service while minimizing gassing in the region near the current collector.

As discussed in greater detail herein, two or more anode compositions may be blended and extruded to form the first electrode such that the portion of the first electrode 18 located proximate the outer surface of the first electrode 18 comprises a concentration of a first anode composition that is higher than the concentration proximate the inner surface of the first electrode; the portion of the first electrode 18 located proximate the inner portion of the first electrode 18 comprises a concentration of the second anode composition that is higher than the concentration proximate the outer surface of the first electrode; and portions of the first electrode 18 between the outer surface and the inner portion continuously transitions between the first composition and the second composition along the radius of the first electrode 18.

Figure 3:
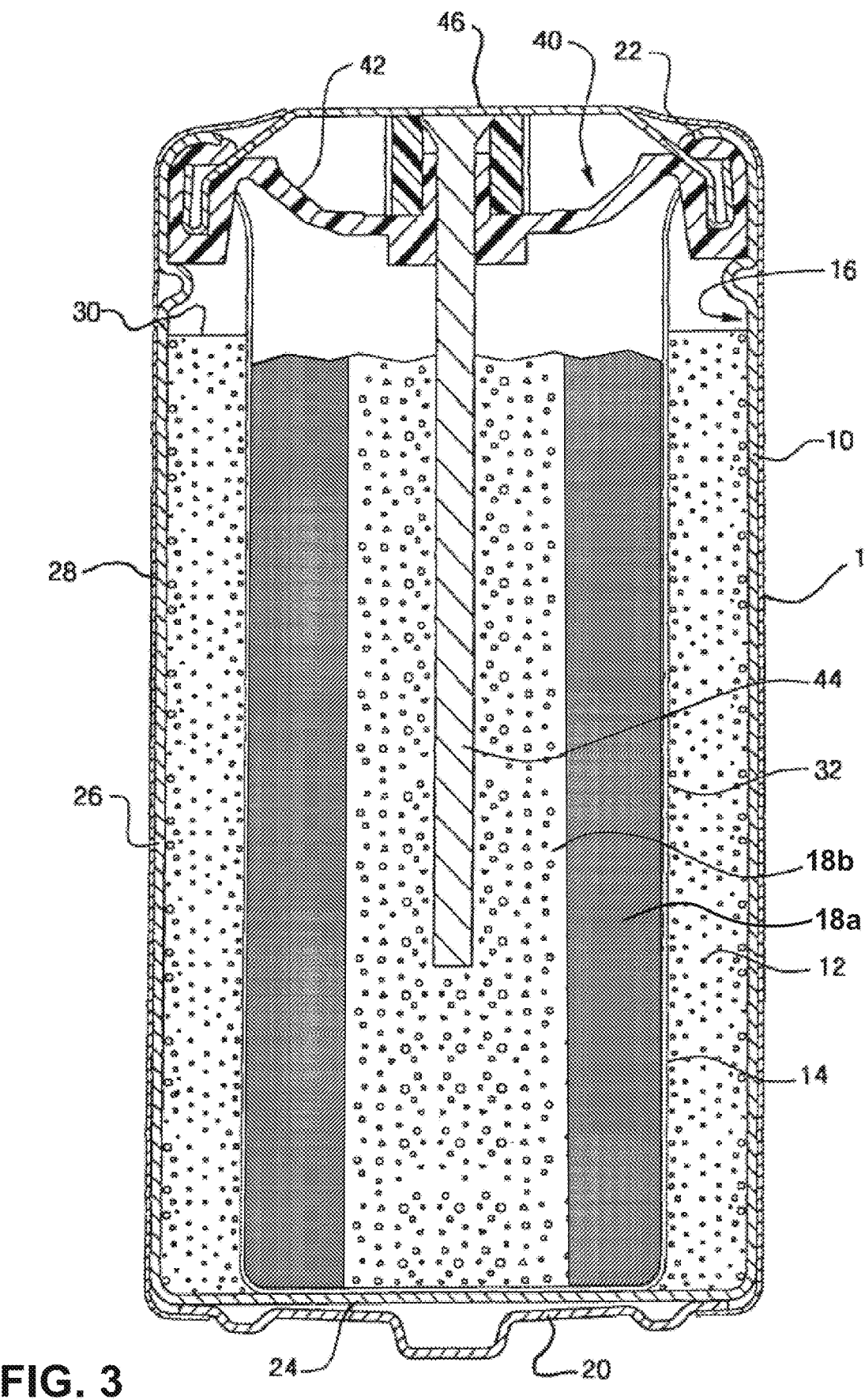
FIG. 3 is a cross-sectional elevational view of an alkaline electrochemical cell according to one embodiment.

In other embodiments, the characteristic gradient may be defined by two or more discrete regions, wherein each region has consistent material characteristics therein. The discrete regions may be formed simultaneously and/or in series. For example, as shown in FIG. 3, which is a side cross-sectional view of an electrochemical cell according to various embodiments, the first electrode 18 may comprise a first portion 18a and a second portion 18b. As shown in FIG. 3, the first portion 18a may be located between the outer surface of the first electrode 18 and the second portion 18b. Accordingly, the second portion may be located between the first portion 18a and the inner portion of the first electrode 18 (e.g., adjacent the current collector 44). Thus, the first portion 18a may define a hollow tubular shape defining an exterior surface coexistent with the exterior surface of the first electrode 18, and an interior surface surrounding an interior opening of the first portion 18a. The second portion 18b may be positioned within the interior opening of the first portion 18a, such that the second portion 18b defines an exterior surface located adjacent the interior surface of the first portion 18a, and an interior portion coexistent with the interior portion of the first electrode 18. In various embodiments, the interface between the first portion 18a and the second portion 18b (defined between the exterior surface of the second portion 18b and the interior surface of the first portion 18a) may define a discrete boundary between the first portion and the second portion. However, in certain embodiments, the interface between the first portion 18a and the second portion 18b may be defined by intermixing between the first portion 18a and the second portion 18b.

Although not shown in FIG. 3, the first electrode 18 of various embodiments may comprise more than two discrete portions. The additional portions may be located between the first portion 18a and the second portion 18b, thereby forming a series of rings (e.g., concentric rings) surrounding the second portion 18b and within the first electrode 18. As will be discussed in greater detail herein, the various discrete portions of the first electrode 18 may be coextruded into the electrochemical cell, the various discrete portions may be extruded into the electrochemical cell in series, and/or the like.

As just one example, the average particle size of the active anode material (e.g., zinc) within the first portion 18a may be larger than the average particle size of the active anode material within the second portion 18b. As another example, the average quantity of active material within the first portion 18a may be greater than the average quantity of active material within the second portion 18b (e.g., measured as a weight-percentage of the active material relative to the total weight of the respective first electrode portion; measured as a volume-percentage of the active material relative to the total weight of the respective first electrode portion; and/or the like). As yet another example, the average quantity of surfactant within the second portion 18a may be greater than the average quantity of surfactant within the second portion 18b (e.g., measured as a weight-percentage of the surfactant relative to the total weight of the respective first electrode portion; measured as a volume-percentage of the surfactant relative to the total weight of the respective first electrode portion; and/or the like). As another example, the type of surfactant used in the first portion 18a may be different than the type of surfactant used in the second portion 18b (e.g., a nonionic surfactant may be used in one portion of the anode and an anionic surfactant may be used in another portion of the anode). As a specific example, a first surfactant having a first affinity for adhering to zinc particles may be provided in the first portion 18a and a second surfactant having a second affinity for adhering to zinc particles (e.g., a lower affinity for adhering to zinc particles) may be provided in the second portion 18b. Such a gradient of surfactant types may enable zinc plating onto the current collector 44, thereby decreasing off-gassing, while providing highly active surfactant within the region of the anode having the highest concentration of zinc oxidation during high-rate discharge.

As yet another example, the type of active material utilized in the first portion 18a may be different than the type of active material utilized in the second portion 18b (e.g., different grades of zinc may be used; zinc purchased from different suppliers may be used; zinc retrieved from different zinc mines may be used; zinc having different average porosity may be used; zinc having different surface roughness characteristics may be used; active materials having different alloy compositions may be used (e.g., different alloys may be used in different anode portions, those alloys may be selected from the non-limiting examples of zinc-bismuth alloys, zinc-indium alloys, zinc-aluminum alloys, and/or the like), and/or the like). As a specific example, a zinc alloy known to be highly reactive may be included in the first portion 18a and a zinc known to be less reactive may be included in the second portion 18b to increase high-rate service (in which zinc reactivity is generally concentrated near the separator) while decreasing off-gassing in the region proximate the current collector 44.

Zinc suitable for use in various embodiments may be purchased from a number of different commercial sources under various designations, such as BIA 100, BIA 115. Umicore, S. A., Brussels, Belgium is an example of a zinc supplier. In a preferred embodiment, the zinc powder generally has 25 to 40 percent fines less than 75 microns, and specifically 28 to 38 percent fines less than 75 microns. Generally lower percentages of fines will not allow desired high rate service to be realized and utilizing a higher percentage of fines can lead to increased gassing. A correct zinc alloy is needed in order to reduce negative electrode gassing in cells and to maintain test service results.

In certain embodiments, the amount of zinc present in the negative electrode ranges generally from about 62 to about 78 weight percent, desirably from about 64 to about 74 weight percent, and specifically about 68 to about, 72 weight percent based on the total weight of the negative electrode, i.e., zinc, solid zinc oxide, surfactant and gelled electrolyte.

The solid zinc oxide utilized in various embodiments may be highly active in order to increase high rate service such as Digital Still Camera (DSC) service, as well as to increase anode rheology and reduce DSC service variability.

The solid zinc oxide added to the anode specifically has high purity and includes low levels of impurities that can result in higher zinc gassing and lowered service. The solid zinc oxide specifically contains less than 30 ppm iron, less than 3 ppm of silver and arsenic, less than 1 ppm of each of copper, nickel, chromium and cadmium, less than 0.50 ppm each of molybdenum, vanadium and antimony, less than 0.1 ppm tin and less than 0.05 ppm germanium.

In various embodiments, a surfactant added to one or more portions of the first electrode 18 may be either a nonionic or anionic surfactant, or a combination thereof. For example, as noted above, a nonionic surfactant may be added to one portion of the first electrode 18 and an anionic surfactant may be added to another portion of the first electrode 18. It has been found that anode viscosity is increased during discharge by the addition of solid zinc oxide alone, but is mitigated by the addition of the surfactant. The addition of the surfactant increases the surface charge density of the solid zinc oxide and lowers anode viscosity as indicated above. Accordingly, adding surfactant to a portion of the anode (e.g., a discrete portion of the anode and/or varying the concentration of the surfactant within the anode) may create a charge distribution gradient within the anode. Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the addition of surfactant results in enhanced surface charge density of solid zinc oxide particle surface. The higher the Brunauer-Emmett-Teller (BET) surface area of solid zinc oxide, the more surfactant can be adsorbed on the solid zinc oxide surface.

In certain embodiments, the surfactant is DISPERBYK-190 from BYK-Chemie GmbH of Wesel, Germany. In various embodiments, the surfactant is present in one or more portions of the first electrode 18 (e.g., the second portion 18b) in an amount sufficient to disperse the solid zinc oxide, such as about 0.00064 to about 0.20 weight percent or more, based on the total weight of the portion of the first electrode 18. However, it should be understood that in embodiments in which the concentration of surfactant varies along the radius of the first electrode 18, the surfactant concentration may vary gradually within the first electrode 18.

DISPERBYK-190 is believed to be a solution including a water soluble, high molecular weight block copolymer including one or more functional groups, believably at least two different types of functional groups. The surfactant has an anionic/nonionic character due to the respective functional groups thereof. It is further believed that the number average molecular weight of a block copolymer DISPERBYK-190 is greater than 1000 measured utilizing gel permeation chromatography. Water solubility may be offset by the presence of a hydrophobic component if present in the electrode composition. In one embodiment, the surfactant is utilized in an amount from about 10 to about 100 ppm and specifically from about 15 to about 50 ppm of zinc utilized in the negative electrode. It is believed that DISPERBYK-190 does not contain any organic solvents and is, therefore, suitable for aqueous systems. DISPERBYK-190 has an acid value in mg KOH/g of 10 and a density of 1.06 g/ml at 20° C.

The aqueous alkaline electrolyte comprises an alkaline metal hydroxide such as potassium hydroxide (KOH), sodium hydroxide, or the like, or mixtures thereof. The alkaline electrolyte used to form the gelled electrolyte of the negative electrode contains the alkaline metal hydroxide in an amount from about 26 to about 36 weight percent, desirably from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service.

A gelling agent may be utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount or gelling agent present is chosen so that lower rates of electrolyte separation are obtained and anode viscosity in yield stress are not too great which can lead to problems with anode dispensing.

Other components which may be optionally present within one or more portions of the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide may be present via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 m2/g or less measured utilizing a Tristar 3000 BET specific surface area analyzer from Micrometrics having a multi-point calibration after the zinc oxide has been degassed for one hour at 150° C.; and a particle size D50 (mean diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

As mentioned briefly herein, the one or more portions of the anode (e.g., a first portion 18a of a first electrode 18; a second portion 18b of the first electrode 18; and/or the entirety of the first electrode 18) may be extruded to form the first electrode within the electrochemical cell. In certain embodiments, various portions of the first electrode 18 may be co-extruded, extruded in series, 3D-printed (e.g., by extruding successive layers of the first electrode 18 to form the entire first electrode 18), and/or the like. In certain embodiments, a first anode composition utilized to form the first portion 18a may be extruded into the electrochemical cell, and a forming plunger may then be extended into the electrochemical cell to form the first portion 18a of the first electrode 18. For example, the forming plunger may form the first portion 18a into a general ring shape within an interior of a second electrode 12 (e.g., on an opposite side of a separator 44) to define an interior surface of the first portion 18a. Thereafter, the second portion 18b may be extruded into the interior portion of the first portion 18a, bound by the interior surface of the first portion 18a.

In one embodiment, the zinc and solid zinc oxide powders, and other optional powders other than the gelling agent, are combined and mixed. In certain embodiments, the zinc and solid zinc oxide powders may be mixed in separate batches corresponding to various portion of the anode. For example, first zinc and zinc oxide powders may be mixed to form a first batch and second zinc and zinc oxide powers may be mixed to form a second batch (e.g., comprising a zinc powder having a different average zinc particle size than the zinc powder of the first batch).

Afterwards, a surfactant may be introduced into the mixture containing the zinc and solid zinc oxide (e.g., the surfactant may be introduced into each of the various batches). A pre-gel comprising alkaline electrolyte, soluble zinc oxide and gelling agent, and optionally other liquid components, may be introduced to the surfactant, zinc and solid zinc oxide mixture(s) which are further mixed to obtain a substantially homogenous mixture (e.g., homogeneous within each batch) before addition to the cell. In various embodiments, one or more component of each batch may be varied to provide a desired anode characteristics difference between each batch (e.g., providing a different quantity of surfactant; providing a different zinc grade; providing a different zinc oxide quantity; and/or the like).

In certain embodiments, a surfactant may be introduced into the electrochemical cell prior to forming the first electrode 18 therein. For example, a surfactant may be mixed with an alkaline electrolyte (e.g., free electrolyte, as discussed herein) to be added to the electrochemical cell after the second electrode 12 is formed therein, but before the first electrode 18 is added within the electrochemical cell. In such embodiments, the surfactant may be temporarily absorbed at least in part by the second electrode 12. Once the first electrode 18 is formed within the interior portion of the second electrode (e.g., via extrusion) the surfactant may be absorbed by the first electrode 18. In such embodiments, the surfactant may be gradually absorbed by the first electrode 18, thereby creating a higher concentration of the surfactant at the exterior surface of the first electrode 18 than an inner portion of the first electrode 18 proximate the current collector 44. Accordingly, the surfactant may form an at least substantially continuous concentration gradient within the first electrode 18. It should be understood that the surfactant may form a continuous concentration gradient within a first electrode 18 having a discrete first portion 18a and second portion 18b. Accordingly, the first electrode 18 may have a first characteristic gradient defined by the continuous surfactant gradient within the first electrode 18 and may simultaneously have a second characteristic gradient defined by the step-wise characteristic gradient (e.g., anode alloy composition gradient, average active material particle size gradient, average active material concentration gradient, and/or the like) defined by the first portion 18a and the second portion 18b.

In a further embodiment, the solid zinc oxide is predispersed in a negative electrode pre-gel comprising the alkaline electrolyte, gelling agent, soluble zinc oxide and other desired liquids, and blended, such as for about 15 minutes. As mentioned above, multiple batches may be provided, each comprising the solid zinc oxide, the alkaline electrolyte, gelling agent, soluble zinc oxide and other desired liquids. In certain embodiments, each batch may comprise a different composition of the combined components, as mentioned above. The solid zinc and surfactant are then added and each batch of the negative electrode composition is blended for an additional period of time, such as about 20 minutes. The amount of gelled electrolyte utilized in each batch the negative electrode composition is generally from about 25 to about 35 weight percent. For example, the amount of gelled electrolyte may be about 32 weight percent based on the total weight of each batch of negative electrode composition. Volume percent of the gelled electrolyte may, in certain embodiments, be about 70% based on the total volume of the negative electrode. In addition to the aqueous alkaline electrolyte absorbed by the gelling agent during the negative electrode manufacturing process, an additional quantity of an aqueous solution of alkaline metal hydroxide, i.e., "free electrolyte", may also be added to the cell during the manufacturing process. The free electrolyte may be incorporated into the cell by disposing it into the cavity defined by the positive electrode or negative electrode, or combinations thereof. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. As discussed herein, the free electrolyte added prior to insertion of the negative electrode may comprise a surfactant composition that is later absorbed by the negative electrode, thereby forming a surfactant concentration gradient within the negative electrode. The remaining portion of the 29 weight percent KOH solution is injected into the separator lined cavity after the negative electrode has been inserted.

In certain embodiments, the one or more batches of negative electrode composition may be combined prior to forming the negative electrode within the electrochemical cell. For example, the one or more batches of negative electrode composition may be combined via a single-screw extrusion mixer, a dual-screw extrusion mixer, and/or the like. In various embodiments, the one or more batches of negative electrode composition may be combined to form a gradient between various portions of the negative electrode. For example, the one or more batches of negative electrode composition may be combined via a mixing component (e.g., a screw extrusion mixer) that enables at least a portion of each batch of negative electrode composition to pass along sides of the mixing component without being blended. In certain embodiments, the various batches may be blended to form a continuous gradient between portions of the negative electrode. For example, as discussed herein, the various batches may be blended and ultimately extruded or otherwise formed within the electrochemical cell such that the negative electrode defines a gradient of electrode characteristics between the formed outer surface of the negative electrode and the formed interior portion of the negative electrode.

In other embodiments, the one or more batches of negative electrode composition may be kept separate until forming the first electrode 18 within the electrochemical cell. In such embodiments, the one or more batches may be coextruded through separate nozzles to form the first electrode 18. The separate nozzles may be at least partially concentric and configured to form concentric portions of the first electrode 18. In other embodiments, a first batch (e.g., destined to form the first portion 18*a* of the negative electrode) may be extruded into the electrochemical cell, and a plunger, mold, or other forming component may be extended into the electrochemical cell to form the first portion 18*a* of the negative electrode within the electrochemical cell. After forming the first portion 18*a*, the second batch may be extruded into the electrochemical cell (e.g., using the same nozzle or a different nozzle than the first batch) to form the second portion 18*b*. In certain embodiments, one or more additional portions (e.g., intermediate portions between the first portion 18*a* and the second portion 18*b*) may be extruded into the electrochemical cell and formed into corresponding portions prior to the formation of the second portion 18*b*, each of these additional portions may be formed in a manner similar to that discussed in reference to the first portion 18*a*.

Second electrode 12, also referred to herein as the positive electrode or cathode, may include manganese dioxide as the electrochemically active material. Manganese dioxide is present in an amount generally from about 80 to about 86 weight percent, such as from about 81 to 85 weight percent by weight based on the total weight of the positive electrode, i.e., manganese dioxide, conductive material, positive electrode electrolyte and additives such as barium sulfate. Manganese dioxide is commercially available as natural manganese dioxide (NMD), chemical manganese dioxide (CMD), or electrolytic manganese dioxide (EMD). The preferred manganese dioxide for use in a cell is EMD. Suppliers of EMD include Tronox Ltd. of Stamford, Conn.; Tosoh Corporation of Tokyo, Japan, and Erachem Comilog, Inc. of Baltimore, Md. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed. Second electrode 12 has a ledge 30 and an interior surface 32 as illustrated in FIG. 1. Alternatively, the positive electrode may be formed by pre-forming a plurality of rings from the mixture comprising manganese dioxide and then inserting the rings into the container to form the tubular-shaped second electrode. The cell shown in FIG. 1 would typically include 3 or 4 rings.

The positive electrode can include other components such as a conductive material, for example graphite, that when mixed with the manganese dioxide provides an electrically conductive matrix substantially throughout the positive electrode. Conductive material can be natural, i.e., mined, or synthetic, i.e., manufactured. In one embodiment, the cells include a positive electrode having an active material or oxide to carbon ratio (O:C ratio) that ranges from about 12 to about 14. Too high of an oxide to carbon ratio decreases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries include Imerys Graphite & Carbon in Bironico, Switzerland and Superior Graphite in Chicago, Ill. Conductive material is present generally in an amount from about 5 to about 10 weight percent based on the total weight of the positive electrode. Too much graphite can reduce manganese dioxide input, and thus cell capacity; too little graphite can increase container to cathode contact resistance and/or bulk cathode resistance. An example of an additional additive is barium sulfate (BaSO4), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component, such as the manganese dioxide, conductive material, and barium sulfate are mixed together to form a homogeneous mixture. During the mixing process, an alkaline electrolyte solution, such as from about 37% to about 40% KOH solution, is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix may be optimized to allow quality positive electrodes to be molded. Mix moisture optimization allows positive electrodes to be molded with minimal splash and flash due to wet mixes, as well as spalling and excessive tool wear due to dry mixes, with optimization helping to achieve a desired high cathode weight. Moisture content in the positive electrode mixture can affect the overall cell electrolyte balance and has an impact on high rate testing.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

The foregoing configurations address common discharge deficiencies associated with existing alkaline-cell batteries operating at high discharge rates. Through experimentation, it has been found that traditional alkaline cells do not entirely discharge when the cells are subject to high discharge rate usage. Specifically, it has been found that oxidation of zinc within the anode that causes the formation of ZnO is concentrated near the separator during high-rate discharge of alkaline cells containing generally homogeneous anodes. As mentioned above, because the ZnO has a higher particle volume than unreacted zinc, the ZnO formation near the separator effectively creates a barrier that impedes discharge of zinc particles positioned closer to the center of the anode.

Accordingly, by providing an anode characteristic gradient, the characteristics of the anode may be modified to accommodate a higher zinc concentration near the separator to increase the quantity of zinc available near the separator after certain depth of the discharge during moderate- and high-rate discharge of the cell. For example, higher concentrations of surfactant may be provided in portions of the anode proximate the separator to spread out the current distribution so that a higher percentage of the anode active materials within the anode participate in the discharge reactions; a larger average particle size of anode active material may be disposed proximate the separator (e.g., to avoid the complete consumption of the zinc near the separator during moderate and high rate discharge); and/or the like. Moreover, the portions of the anode closer to the current collector may be modified to have decreased gassing characteristics, thereby reducing undesirable gassing when the anode is highly discharged.

By providing a characteristic gradient within the anode, the overall electrical capacity of the anode may remain substantially unchanged relative to traditional, homogenous anode formulations, however the portions of the anode known to discharge more quickly in high-rate discharge applications may be modified to increase the electrical capacity of the anode in those regions. Because the overall electrical capacity of the anode remains substantially unchanged relative to homogenous anode formulations, an anode defining a characteristic gradient theoretically has similar low-rate discharge performance similar to traditional homogenous anode formulations.

CONCLUSION

Many modifications and other embodiments of the inventions set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A primary alkaline electrochemical cell comprising:
a container;
a cathode forming a hollow cylinder and having a cathode outer surface adjacent an inner surface of the container and a cathode inner surface defining an interior portion of the cathode;
an anode positioned within an interior portion of the cathode and formed of one or more materials including an active material comprising zinc, wherein the anode defines an anode outer surface and a central portion;
a separator disposed between the anode outer surface and the cathode inner surface;
a current collector; and
an electrolyte;
wherein the anode comprises two or more discrete regions,
wherein the two or more discrete regions comprise a first anode portion that is characterized by consistent first anode characteristic therein and is adjacent to a current collector, and a second anode portion that is characterized by consistent second anode characteristic therein and is separated from the current collector by the first anode portion;
wherein each of the first anode characteristic and the second anode characteristic define an active material density and at least one of an active material particle size, an active material concentration, an active material composition, an active material surface roughness, or an active material porosity within the first anode portion and the second anode portion respectively;
wherein the active material density and the at least one of an active material particle size, an active material concentration, an active material composition, an active material surface roughness, or an active material porosity defined by the first anode characteristic are different from the active material density and the corresponding at least one of an active material particle size, an active material concentration, an active material composition, an active material surface roughness, or an active material porosity defined by the second anode characteristic; and
wherein a part of the first anode portion is intermixed with a part of the second anode portion such that the part of the first anode portion is in contact with the part of the second anode portion.

2. The primary alkaline electrochemical cell of claim 1, wherein the first anode portion comprises the central portion of the anode and the second anode portion is positioned between the anode outer surface and the first anode portion.

3. The primary alkaline electrochemical cell of claim 1, wherein the first anode characteristic and the second anode characteristic define a difference in an average particle size of an active material between the central portion of the anode and the anode outer surface.

4. The primary alkaline electrochemical cell of claim 2, wherein the first anode material composition comprises an active material having a first average particle size and the second anode material composition comprises an active material having a second average particle size, wherein the first average particle size is different from the second average particle size.

5. The primary alkaline electrochemical cell of claim 4, wherein the first average particle size is smaller than the second average particle size.

6. The primary alkaline electrochemical cell of claim 2, wherein at least one of the first anode material or the second anode material comprises a surfactant, and wherein the first anode portion comprises a first concentration of the surfactant and the second anode portion comprises a second concentration of the surfactant, wherein the first concentration of the surfactant is different from the second concentration of the surfactant.

7. The primary alkaline electrochemical cell of claim 1, wherein the first concentration of the surfactant is lower than the second concentration of the surfactant.

8. The primary alkaline electrochemical cell of claim 1, wherein the first anode characteristic and the second anode characteristic define a difference in an active material alloy between the central portion of the anode and the anode outer surface.

9. The primary alkaline electrochemical cell of claim 8, wherein the difference in the active material alloy is defined between a first active material alloy in the first anode portion and a second active material alloy in the second anode portion located adjacent the anode outer surface.

10. The primary alkaline electrochemical cell of claim 1, wherein the first anode characteristic and the second anode characteristic define a difference in an active material concentration between the central portion of the anode and the anode outer surface.

11. The primary alkaline electrochemical cell of claim 1, wherein at least one of the first anode portion or the second anode portion comprises a surfactant, and wherein the first anode characteristic and the second anode characteristic define a concentration difference of surfactant between the central portion of the anode and the anode outer surface.

12. The primary alkaline electrochemical cell of claim 1, wherein the first anode portion and the second anode portion collectively define a continuous anode formed of at least the first anode characteristic and the second anode characteristic.

13. The primary alkaline electrochemical cell of claim 1, wherein the first anode portion and the second anode portion are concentrically defined such that the second anode portion circumferentially encloses the first anode portion.

14. A method of forming primary alkaline electrochemical cell, the method comprising:
   providing a container;
   forming a cathode within the container, wherein the cathode is a hollow cylinder and defining a cathode outer surface positioned adjacent an interior surface of the container and a cathode interior surface defining an inner portion of the cathode;
   positioning a separator within the inner portion of the cathode; and
   forming an anode comprising a zinc active material and defining an anode outer surface and an anode central portion, the anode comprising two or more discrete regions,
   wherein the separator is disposed between the anode outer surface and the cathode inner surface,
   wherein the two or more discrete regions comprise a first anode portion that is characterized by consistent first anode characteristic therein and is adjacent to a current collector, and a second anode portion that is characterized by consistent second anode characteristic therein and is separated from the current collector by the first anode portion,
   wherein each of the first anode characteristic and the second anode characteristic define an active material density and at least one of an active material particle size, an active material concentration, an active material composition, an active material surface roughness, or an active material porosity within the first anode portion and the second anode portion respectively; and
   wherein the first anode characteristic is different than the second anode characteristic, and a part of the first anode portion is intermixed with a part of the second anode portion such that the part of the first anode portion is in contact with the part of the second anode portion.

15. The method of claim 14, wherein forming the first anode portion comprises extruding a first anode composition having a first average active material particle size into the inner portion of the cathode; and
   forming the second anode portion comprises extruding a second anode composition having a second average active material particle size into the central portion of the anode, wherein the second average active material particle size is smaller than the first average active material particle size.

16. The method of claim 14, wherein forming the first anode portion comprises extruding a first anode composition comprising a surfactant in a first concentration into the inner portion of the cathode; and
   forming the second anode portion comprises extruding a second anode composition comprising the surfactant in a second concentration into the central portion of the anode, wherein the first concentration is greater than the second concentration.

17. The method of claim 14, wherein forming the first anode portion and forming the second anode portion collectively comprise coextruding the first anode portion and the second anode portion.

18. The method of claim 14, wherein forming the first anode portion comprises:
   extruding a first anode composition into the inner portion of the cathode; and
   extending a plunger into the inner portion of the cathode to mold the first anode portion to define the anode outer surface and an anode interior surface; and
   forming the second anode portion comprises extruding the second anode portion into the central portion of the anode.

* * * * *

UNITED STATES PATENT AND TRADEMARK OFFICE
CERTIFICATE OF CORRECTION

PATENT NO. : 11,322,752 B2
APPLICATION NO. : 15/896917
DATED : May 3, 2022
INVENTOR(S) : Huang Page 1 of 1

It is certified that error appears in the above-identified patent and that said Letters Patent is hereby corrected as shown below:

In the Claims

Column 14,
Lines 28, and 30-31, "characterized by consistent", each occurrence, should read --characterized by a consistent--.

Column 15,
Claim 7, Lines 17-18, "wherein the first concentration of the surfactant is lower than the second concentration
of the surfactant" should read --wherein at least one of the first anode portion or the second anode portion comprises a surfactant, and wherein the first anode characteristic and the second anode characteristic define a concentration difference of surfactant between the central portion of the anode and the anode outer surface--;
Claim 11, Lines 34-39, "claim 1, wherein at least one of the first anode portion or the second anode portion comprises a surfactant, and wherein the first anode characteristic and the second anode characteristic define a concentration difference of surfactant between the central portion of the anode and the anode outer surface" should read --claim 7, wherein the first concentration of the surfactant is lower than the second concentration of the surfactant--.

Column 16,
Lines 8, and 10-11, "characterized by consistent", each occurrence, should read --characterized by a consistent--.

Signed and Sealed this
Twenty-fifth Day of July, 2023

Katherine Kelly Vidal
*Director of the United States Patent and Trademark Office*